United States Patent [19]

Huston et al.

[11] Patent Number: 4,614,116

[45] Date of Patent: Sep. 30, 1986

[54] PHASE SENSITIVE ULTRASONIC MODULATION METHOD FOR THE DETECTION OF STRAIN-SENSITIVE SPECTRAL FEATURES

[75] Inventors: Alan L. Huston, Springfield, Va.; William E. Moerner, Fremont, Calif.

[73] Assignee: International Business Machines Corporation, Armonk, N.Y.

[21] Appl. No.: 697,674

[22] Filed: Feb. 4, 1985

[51] Int. Cl.[4] .................................. G01N 29/00
[52] U.S. Cl. ...................... 73/657; 73/584; 350/358; 356/432
[58] Field of Search ............ 350/358; 73/584, 655, 73/657; 356/317, 318, 432, 402

[56] References Cited

U.S. PATENT DOCUMENTS 4,101,976  7/1978  Castro et al. .................. 365/119
4,297,035  10/1981  Bjorklund ...................... 356/402

OTHER PUBLICATIONS

Huston et al.; Journal of the Optical Society of America B, vol. 1, No. 3, Jun. 1984, pp. 349-353.
Bjorklund et al; U.S. patent application Ser. No. 06/511,593, filed Jul. 7, 1983.
Romagnoli et al.; Journal of the Optical Society of America B, vol. 1, pp. 341-348 (1984).
Clare et al.; J. Phys. C: Solid St. Phys. 13 (1980) 865-78.
Lengfellner et al.; Appl. Phys. Lett. 43 (5) (1983) pp. 437-439.

Primary Examiner—Howard A. Birmiel
Attorney, Agent, or Firm—Joseph E. Kieninger; Joseph G. Walsh

[57] ABSTRACT

A phase-sensitive ultrasonic modulation method for the detection of strain-sensitive spectral features involves the use of an ultrasonic field with well-defined wavefronts and a light beam of spot size less than the ultrasonic wavelength and of linewidth less than that of the spectral feature. When the light wavelength coincides with the wavelength of the spectral feature, the ultrasonic wave shifts, splits, or broadens the absorption lineshapes of the various centers contributing to the spectral feature thereby changing the amplitude or phase of the light beam or emitted fluorescence in synchrony with the ultrasonic field.

9 Claims, 2 Drawing Figures

PHASE SENSITIVE ULTRASONIC MODULATION METHOD FOR THE DETECTION OF STRAIN-SENSITIVE SPECTRAL FEATURES

TECHNICAL FIELD

This invention relates to the detection of strainsensitive spectral features and more particularly to a phase sensitive ultrasonic modulation method for detecting these features.

BACKGROUND ART

Strain-sensitive spectral features are portions of optical absorption lines that shift, split, or broaden under the influence of an applied ultrasonic field. One class of strain-sensitive spectral features are spectral holes, which consist of narrow depressions or dips in the inhomogeneously broadened absorption lines of centers in solids at low temperatures. Persistent spectral hole formation, or hole burning, has been produced by photochemical processes in organic and inorganic systems as well as by nonphotochemical or photophysical mechanisms in glasses and crystals. In addition to providing important basic information about guest-light and guest-host interactions, persistent spectral holes can be used to store digital data in a frequency domain optical storage system, described in U.S. Pat. No. 4,101,976. Because holes burned on nanosecond time scales are usually shallow (see for example, Romagnoli, et al., Journal of the Optical Society of America B: Optical Physics, Vol. 1, 341 (1984)), high sensitivity methods for the detection and/or observation of spectral holes at a high speed are essential.

A variety of optical techniques are available for the detection of specific spectral features including spectral holes. The most elementary methods include transmission spectroscopy and fluorescence excitation with narrow band tunable lasers. These techniques suffer from the limitation that they do not have zero background, so that detection of shallow holes is limited by the ability to accurately remove large baselines. Other detection techniques have been devised for the detection of weak spectral features which utilize indirect, external modulation to achieve high sensitivity and/or zero background. For example, frequency modulation (FM) spectroscopy (described in U.S. Pat. No. 4,297,035) phase-modulates a probing laser beam before passing the beam through the absorbing sample. In fact, FM spectroscopy has been applied to the detection of spectral holes with zero background. Because the signal appears as amplitude modulation of a laser beam at MHz frequencies where laser noise fluctuations are only due to shot-noise, this method can show quantum-limited sensitivity. However, FM spectroscopy requires an electro-optic modulator for the production of frequency modulated light to probe the sample transmission. In addition, residual amplitude modulation hampers the application of FM spectroscopy in some cases.

External modulation methods like FM spectroscopy, including amplitude modulation, wavelength modulation, frequency modulated polarization spectroscopy (described in Ser. No. 06/511593 filed July 7, 1983) and polarization spectroscopy also suffer the following shortcoming. Any perturbation of the carefully prepared probing beam by any optical element in the system other than the sample will produce spurious background signals. The frequency modulated polarization spectroscopy technique overcomes this problem to an extent, but this method is complex and requires anisotropic holes. For example, FM spectroscopy suffers from spurious signals due to any frequency-dependent transmission present in all optical elements between the modulator and the detector other than the sample such as Fabry-Perot resonances in windows, lens coatings, etc. Polarization spectroscopy is sensitive to low frequency laser power fluctuations and background birefringence. The basic fact is that with the external modulation detection methods described above, all frequency-dependent absorptions and dispersions are detected including effects that arise from other reasons than the property of the sample under study.

Ultrasonically modulated electron paramagnetic resonances have been reported in J. Phys. C. Solid State Vol 13, p 865 (1980). In this non-optical technique, effects of 40 KHz strain fields were compared with 40 KHz magnetic fields. Incoherent, non-phase-sensitive ultrasonic modulation of persistent spectral holes has also been reported in Appl. Phys. Letter Vol 43, page 437 (1983). The method used incoherent pulses of ultrasound to modulate persistent holes. The paper emphasized that this technique can be used as a phase-insensitive optical detector for ultrasound in solids.

SUMMARY OF THE INVENTION

It is a primary object of this invention to provide an improved method of detecting strain-sensitive spectral features.

It is another object of this invention to provide a method of detecting strain-sensitive spectral features that is sensitive to the phase of the strain field.

It is another object of this invention to provide a method of detecting strain-sensitive spectral features that has zero background.

It is yet another object of this invention to provide a method of detecting strain-sensitive spectral features that operates on a MHz time scale, a frequency regime where laser noise is only due to quantum statistical fluctuations.

These and other objects are accomplished by a method for the detection of strain-sensitive spectral features that utilizes direct modulation of the features in synchrony with an ultrasonic strain field. This phase-sensitive ultrasonic modulation method involves the generation of an ultrasonic field with well-defined wavefronts in a sample containing a strain-sensitive spectral feature. The spectral feature may be, for example, a spectral hole formed by photochemical hole-burning or nonphotochemical hole-burning. The ultrasonic field may be generated by a transducer which is bonded to the side of a sample so that the wavefronts of the ultrasonic wave are oriented parallel to the light beam direction. The spot size of the light beam must be smaller than the ultrasonic wavelength in order to achieve phase sensitivity, and the linewidth of the light beam must be narrower than that of the spectral feature. Modulation of the probing light beam occurs when the ultrasonic wave shifts or splits the absorption line shapes of the various centers contributing to the spectral feature thereby changing the shape or wavelength of the feature in synchrony with the ultrasonic field. The resulting modulation of the frequency or phase of the light beam or of emitted fluorescence is detected, signifying the presence of the spectral feature.

Other objects of this invention will be apparent from the following detailed description, reference being made to the following drawings in which a specific embodiment of the invention is shown.

DESCRIPTION OF THE PREFERRED EMBODIMENT

Figure 1:
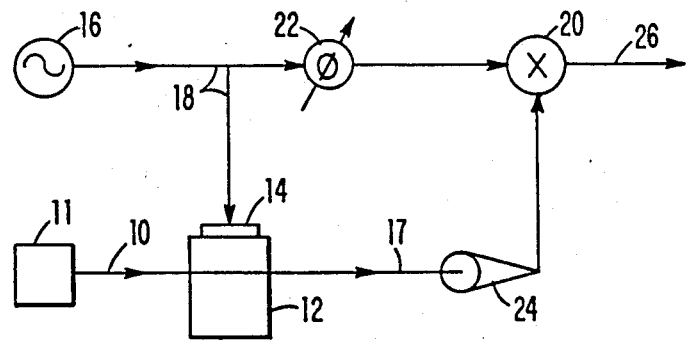
FIG. 1 is a schematic view of the essential elements used in accordance with this invention.

In accordance with this invention, the essential elements are shown in FIG. 1. The output beam 10 of a tunable light source 11 impinges on the sample 12 containing a strain-sensitive spectral feature. The strain-sensitive spectral feature may be a spectral hole or a narrow absorption line of an impurity that shifts, splits, or broadens in an ultrasonic field. For example, the strain-sensitive spectral feature may consist of a spectral hole in the absorption of color centers, ions, or molecules in crystals, glasses, or polymers at low temperatures. The light source may be a laser or other source of light: the only requirement is that the linewidth of the light source be less than that of the spectral feature of interest.

A well-defined ultrasonic field must be generated in the region of the sample to be probed by the light beam. This ultrasonic field may be generated by a piezoelectric transducer 14 that has been bonded to the sample by methods known in the art or by any other device or method that generates ultrasonic waves, such as photoacoustic generation. In fact, the ultrasonic wave may be generated directly in the sample itself if the sample is made of a piezoelectric material, for example, poly(-vinylidene fluoride). The critical requirement is that during any instant of the ultrasonic period, only one phase of ultrasound is present in the region of the sample probed by the light beam. For instance, if the ultrasound is longitudinal, the light beam must overlap with compression and rarefaction alternately during each cycle of the ultrasonic wave. Similarly, if the ultrasound is a shear wave, the light beam must overlap with positive and negative shear alternately during each cycle of the ultrasonic wave. To achieve this, the beam 10 impinges on the sample with a spot diameter less than the ultrasonic wavelength. For example, for sodium fluoride crystals and 8 MHz ultrasound, the laser spot diameter should be smaller than 760 microns. For optimum signal, the laser apot should in fact be less than one-half the ultrasonic wavelength; however, phase-sensitive signals will result from any spot size less that the ultrasonic wavelength.

As a specific example, an ultrasonic transducer 14 can be bonded to the side of the sample 12 so that the wavefronts of an ultrasonic wave generated in the transducer 14 are oriented parallel to the laser beam direction. To achieve maximum signal in this geometry, reflections of the ultrasound from the opposite side of the sample must be prevented from altering the well-defined phase in the region of the sample probed by the light beam. This may be achieved in any of several ways: for example the entire experiment may be performed in a time less than the round-trip time of ultrasound in the sample. Another possibility would be to prepare the sample with ultrasonic matching materials to prevent ultrasonic reflections from the opposite side of the sample. A third possibility would be to establish a standing wave resonance of the ultrasound in the sample. A further possibility would be to utilize a lossy sample material so that the ultrasonic field decays before reflections can reach the region of the sample probed by the light beam.

Geometries other than that shown in FIG. 1 can also be used; for example, if the sample consists of an ultrasonically lossy thin film such as a polymer, the light beam can be propagated through one of the smaller faces of a transparent nonabsorbing prism on which the sample has been bonded to the hypotenuse of the prism. The ultrasonic field can them be generated by a transducer bonded to the other small face of the prism. Another possible geometry would involve bonding of a thin sample directly to the polished reflecting face of the transducer. The light beam can then be propagated through the sample, reflected off the face of the transducer, and finally propagated through the sample again before traveling to the detector.

To excite the transducer or other ultrasonic source and provide a phase reference, an RF oscillator 16 generates an RF signal, for example, an 8 MHz RF signal which is transmitted to the transducer 14. An example of the transducer 14 is a 8 MHZ x-cut quartz transducer.

When spectral holes or other strain-sensitive spectral features are present in the sample 12 at the wavelength of the light beam, the ultrasonic wave 18 passing through the transducer 14 shifts, splits, or broadens the absorption line shapes of the various centers in the sample 12 contributing to the spectral feature thus changing the shape or the wavelength of the feature. This leads to a modulation of the light beam at the ultrasonic frequency, for example at 8 MHz. The amplitude modulation can be phase sensitively detected using a double balanced mixer 20 and phase shifter 22 as shown in FIG. 1 which is known in the art. A modulated light beam or a beam of fluorescence emerging from the sample 12 is detected by a high speed detector 24, for example a photodiode or a photomultiplier. The current output of the detector 24 is combined with a phaseshifted local oscillator signal in the mixer 20 to yield a resultant phase-sensitive signal 26.

A key feature of this invention is that since the detection is performed at RF frequencies, the technique can be quite fast, limited only the acoustic transit time across the light beam spot and the period of the ultrasonic field. For example, with 8 MHz ultrasound traveling at $0.5 \times 10^6$ cm/s and a light beam spot diameter of 500 microns, the ultrasonic wave completely traverses the laser beam in 100 ns. In this case, the ultrasound traverses the light beam in a time comparable to the period of the 8 MHz ultrasound, 125 ns. As is usual, the modulation cannot be detected in a time less than the ultrasonic period, so in this example, the spectral feature can be detected in a time on the order of 125 ns.

EXAMPLE 1

Figure 2:
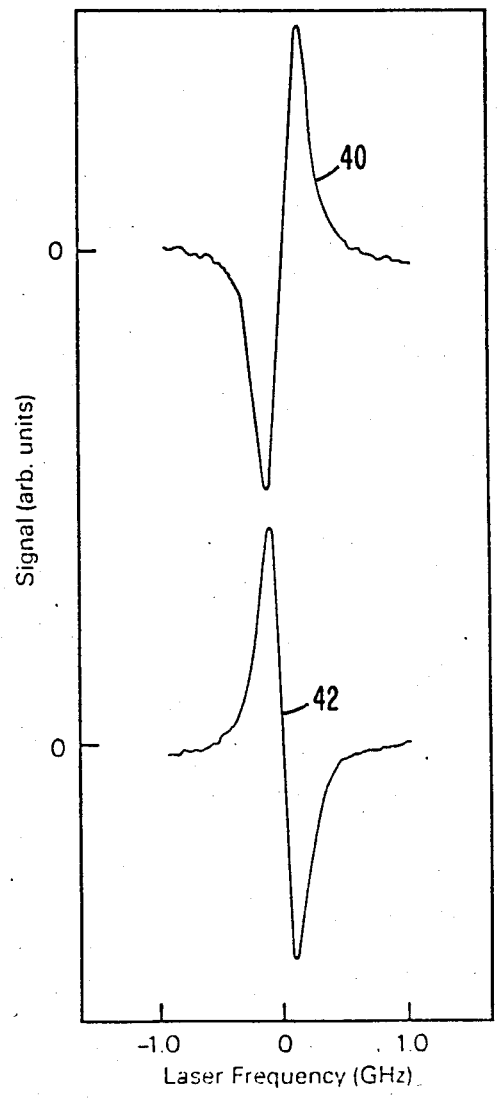
FIG. 2 illustrates the signals that are generated by the presence of photochemical holes, in particular the sensitivity of the signals to the phase of the ultrasonic field.

Since spectral holes in inhomogeneously broadened lines are by their very nature strain sensitive, such spectral holes can be easily detected by using the ultrasonic modulation method described in this invention. The sample was composed of X-ray irradiated NaF containing $F_3^+$ color centers, and spectral holes were produced with a single-frequency laser. The arrangement shown in FIG. 1 was used with one minor modification. The rf signal at 8 MHz driving the transducer as pulsed at 10 KHz at duty cycles from 5% to 50% and the output of the mixer was detected with a boxcar averager with 100 μsec time constant. The ultrasound was pulsed because no effort was made to reduce reflections from the opposite side of the sample. The ultrasonic reflections reduced the size of the signal for times longer than 20–50 microseconds after the start of the ultrasonic wave. wave. This pulsing of the ultrasound was not essential, however, continuous wave excitation of the transducer also produced phase sensitive spectral hole signals at the output of the mixer. The resulting signals from photochemical holes are shown in FIG. 2. The horizontal axis corresponds to one laser scan over 2 GHz in frequency. The vertical axis indicates the signal in artibrary units, for example volts at the output of the boxcar averager. Curve 40 is the detected hole signal with 0° phase shift as selected by the phase shifter 22. Curve 42 is the detected hole signal with 180° phase shift, where the inversion in sign of the signal proves that the signal is sensitive to the phase of the ultrasonic wave. Curves 40 and 42 have been offset for clarity; they both have a zero direct current value.

Similar inversions in signs can be observed if the experiment is repeated with the laser beam translated on the sample in a direction parallel to the ultrasonic propagation vector. The irradiation of the holes with ultrasound does not appreciably erase the holes, even with irradiation periods of time lasting 10–20 minutes or more. It has been observed that the background due to acousto-optic interactions in the host crystal is negligible due to the extremely low ultrasonic powers required for these tests.

This detection method has a number of advantages. The method uses direct internal modulation of only the effect under study, has zero-background, high sensitivity, simplicity and is applicable to all types of spectral holes simply because spectral holes are intrinsically sensitive to strain.

Although a preferred embodiment has been described, it is understood that numerous variations may be made in accordance with the principles of this invention.

We claim:

1. A high-speed method for detecting strainsensitive spectral features in a sample, said method comprising the steps of
    a. providing a sample containing a strain-sensitive spectral feature
    b. generating an ultrasonic field of a frequency greater than 1 MHz in the sample,
    c. propagating a light beam with a spot size smaller than the ultrasonic wavelength and with a spectral linewidth narrower than that of the spectral feature through a region of the sample containing the spectral feature and a well-defined wavefront of the ultrasonic field whereby the amplitude or phase of the light beam is modulated, and
    d. detecting the modulated light beam emerging from the sample.

2. A method as described in claim 1 whereby said spectral feature has been formed by spectral hole-burning of absorbing centers in an inhomogeneously broadened absorption line.

3. A method as described in claim 1 whereby said ultrasonic field is generated by an external transducer bonded to the sample.

4. A method as described in claim 1 whereby said ultrasonic field is generated directly in a sample of a piezoelectric material.

5. A method as described in claim 1 whereby said light beam is propagated parallel to the ultrasonic wavefronts.

6. A method as described in claim 1 whereby said light beam is produced by a laser with linewidth narrower than that of the spectral feature.

7. A method as described in claim 1 whereby the amplitude or phase modulation is detected in a time less than the ultrasonic round-trip transit time in the sample.

8. A method as described in claim 1 whereby the sample is prepared so that no reflections of the ultrasound occur.

9. A method as described in claim 1 whereby the sample emits fluorescence in response to the incident light beam, and where modulation of the emitted fluorescence caused by the ultrasonic field is detected.

* * * * *